(12) United States Patent
Patel et al.

(10) Patent No.: US 8,886,569 B2
(45) Date of Patent: Nov. 11, 2014

(54) SYSTEM AND METHOD FOR LOCATION BASED MOBILE COMMERCE

(75) Inventors: Amol Patel, Los Altos, CA (US); Suraj Satheesan Menon, Foster City, CA (US)

(73) Assignee: eBay Inc., San Jose, CA (US)

( * ) Notice: Subject to any disclaimer, the term of this patent is extended or adjusted under 35 U.S.C. 154(b) by 282 days.

(21) Appl. No.: 12/495,738

(22) Filed: Jun. 30, 2009

(65) Prior Publication Data

US 2010/0332339 A1 Dec. 30, 2010

(51) Int. Cl.
*G06Q 99/00* (2006.01)
*G06Q 30/06* (2012.01)
*H04W 4/02* (2009.01)
*H04W 4/18* (2009.01)
*G06Q 20/32* (2012.01)

(52) U.S. Cl.
CPC ........... *G06Q 30/0603* (2013.01); *H04W 4/023* (2013.01); *H04W 4/02* (2013.01); *H04W 4/18* (2013.01); *G06Q 30/0601* (2013.01); *G06Q 20/3224* (2013.01)
USPC .......................................... 705/64; 705/14.58

(58) Field of Classification Search
USPC ............................................... 705/14.58, 64
See application file for complete search history.

(56) References Cited

U.S. PATENT DOCUMENTS

| | | | |
|---|---|---|---|
| 6,098,048 A | 8/2000 | Dashefsky et al. |
| 6,317,718 B1 | 11/2001 | Fano |
| 6,408,307 B1 | 6/2002 | Semple et al. |
| 6,415,291 B2 | 7/2002 | Bouve et al. |
| 6,448,979 B1 | 9/2002 | Schena et al. |
| 6,549,833 B2 | 4/2003 | Katagishi et al. |
| 6,687,608 B2 | 2/2004 | Sugimoto et al. |
| 6,735,504 B2 | 5/2004 | Katagishi et al. |
| 6,829,532 B2 | 12/2004 | Obradovich et al. |
| 6,895,316 B2 | 5/2005 | Chen et al. |
| 6,920,382 B2 | 7/2005 | Katagishi et al. |
| 7,082,409 B1 | 7/2006 | Cherry |
| 7,246,009 B2 | 7/2007 | Hamblen et al. |

(Continued)

FOREIGN PATENT DOCUMENTS

| | | |
|---|---|---|
| JP | 2003196566 | 7/2003 |
| KR | 2008/0038850 | 5/2008 |
| WO | WO 2006/134795 | 12/2006 |

OTHER PUBLICATIONS

Machine translation of Korean Patent Publication KR20080038850 obtained from http://translationportal.epo.org/...gle&FORMAT=docdb&KIND=A&LOCALE=en_EP&NUMBER=200800388 50&OPS=jp.espacenet.com/ops&SRCLANG=ko&TRGLANG=en, downloaded Mar. 4, 2014, 7 pages. (2008 publication).*

(Continued)

*Primary Examiner* — James D Nigh
(74) *Attorney, Agent, or Firm* — Haynes and Boone, LLP

(57) ABSTRACT

In accordance with one or more embodiments of the present disclosure, a method for facilitating financial transactions over a network includes communicating with a user via a first mobile communication device over the network, obtaining a geo-location of the first mobile communication device, communicating with a merchant via a second mobile communication device over the network, obtaining a radius of coverage for the second mobile communication device, determining whether the geo-location of the first mobile communication device is within the radius of coverage of the second mobile communication device, and providing a listing to the first mobile communication device of one or more items for sale by the merchant when the first mobile communication device is within the radius of coverage of the second mobile communication device.

20 Claims, 6 Drawing Sheets

(56) References Cited

U.S. PATENT DOCUMENTS

| | | | |
|---|---|---|---|
| 7,330,112 | B1 | 2/2008 | Emigh et al. |
| 7,386,477 | B2 | 6/2008 | Fano |
| 7,707,413 | B2* | 4/2010 | Lunt et al. .................... 713/168 |
| 7,890,376 | B2* | 2/2011 | Barrese et al. ............... 705/26.9 |
| 2001/0049636 | A1 | 12/2001 | Hudda et al. |
| 2002/0035474 | A1 | 3/2002 | Alpdemir |
| 2002/0075298 | A1 | 6/2002 | Schena et al. |
| 2004/0091111 | A1* | 5/2004 | Levy et al. .................... 380/202 |
| 2004/0122685 | A1* | 6/2004 | Bunce .............................. 705/1 |
| 2005/0091118 | A1 | 4/2005 | Fano |
| 2005/0144086 | A1* | 6/2005 | Speiser et al. ................. 705/26 |
| 2005/0216583 | A1 | 9/2005 | Cole et al. |
| 2005/0222933 | A1 | 10/2005 | Wesby |
| 2006/0099964 | A1* | 5/2006 | Barrese et al. ............. 455/456.3 |
| 2006/0149624 | A1* | 7/2006 | Baluja et al. .................... 705/14 |
| 2007/0287473 | A1* | 12/2007 | Dupray ...................... 455/456.1 |
| 2008/0004888 | A1* | 1/2008 | Davis et al. ....................... 705/1 |
| 2008/0040141 | A1* | 2/2008 | Torrenegra et al. ............... 705/1 |
| 2008/0311893 | A1 | 12/2008 | Liu et al. |
| 2009/0248435 | A1* | 10/2009 | Macwan .......................... 705/1 |

OTHER PUBLICATIONS

Aphrodite Tsalgatidou et al., Mobile e-commerce and location-based sevices: technology and requirements, article availabe at http://www.scangis.org/scangis2003/papers/27.pdf, 14 pages.

Steiniger et al, "Foundations of Location Based Services", CartouCHe- Lecture notes on LBS, Dept. of Geography, Univ. of Zurich, vol. 1.0, Jan. 1, 2006, pp. 1-28 XP007908352, Zurich, Switzerland.

* cited by examiner

SYSTEM AND METHOD FOR LOCATION BASED MOBILE COMMERCE

BACKGROUND

1. Technical Field

The present invention generally relates to facilitating financial transactions over a network and more particularly to location based mobile commerce.

2. Related Art

In online financial transactions, customers search for and purchase products through electronic communications with online merchants over electronic networks, including mobile communication networks. During the course of these online transactions, customers may not readily know the physical location of the products or the merchants offering the products for sale or purchase consideration. Typically, after purchase these products are shipped via mail to an address related to the customers. Sometimes, waiting for the purchased products can be inconvenient and unnecessary.

Accordingly, there currently exists a need to localize merchant searches that give the customers ready access products and services.

SUMMARY

Embodiments of the present disclosure relate to facilitating financial transactions over a network and to location based mobile commerce. In various embodiments, systems and methods for facilitating financial transactions over a network include communicating with a user via a first mobile communication device over the network, obtaining a geo-location of the first mobile communication device, communicating with a merchant via a second mobile communication device over the network, obtaining a radius of coverage for the second mobile communication device, determining whether the geo-location of the first mobile communication device is within the radius of coverage of the second mobile communication device, and providing a listing to the first mobile communication device of one or more items for sale by the merchant when the first mobile communication device is within the radius of coverage of the second mobile communication device.

In various implementations, the system and method include receiving one or more release parameters from the user via the first mobile communication device, wherein the release parameters allowing release of geo-location information from the first mobile communication device. The system and method include receiving one or more search parameters from the user via the first mobile communication device, wherein the search parameters identifying at least one specific item selected by the user. The system and method include receiving one or more merchant parameters from the merchant via the second mobile communication device, wherein the merchant parameters identifying the radius of coverage selected by the merchant.

In various implementations, the system and method include verifying the identity of the user based on user information obtained from the first mobile communication device and verifying the identity of the merchant based on merchant information obtained from the second mobile communication device. The system and method include receiving a purchase request for at least one item on the listing from the user via the first mobile communication device and processing the purchase request on behalf of the user and the merchant. The system and method include maintaining at least one account for each of the user and the merchant, wherein the accounts include account information related to the user and the merchant, and wherein the account information comprises private financial information of the user and the merchant including at least one or more account numbers, passwords, credit card information, and banking information.

In various implementations, the geo-location includes information related to at least one of a zipcode and global positioning system (GPS) coordinates including longitude and latitude coordinates. The radius of coverage includes information related to an area of one or more zip-codes and an area of one or more GPS coordinates including longitude and latitude coordinates. The network includes a mobile communication network and/or the Internet, and the first and second mobile communication devices include mobile (e.g., cellular) phones.

These and other features and advantages of the present invention will be more readily apparent from the detailed description of the embodiments set forth below taken in conjunction with the accompanying drawings.

Figure 1:
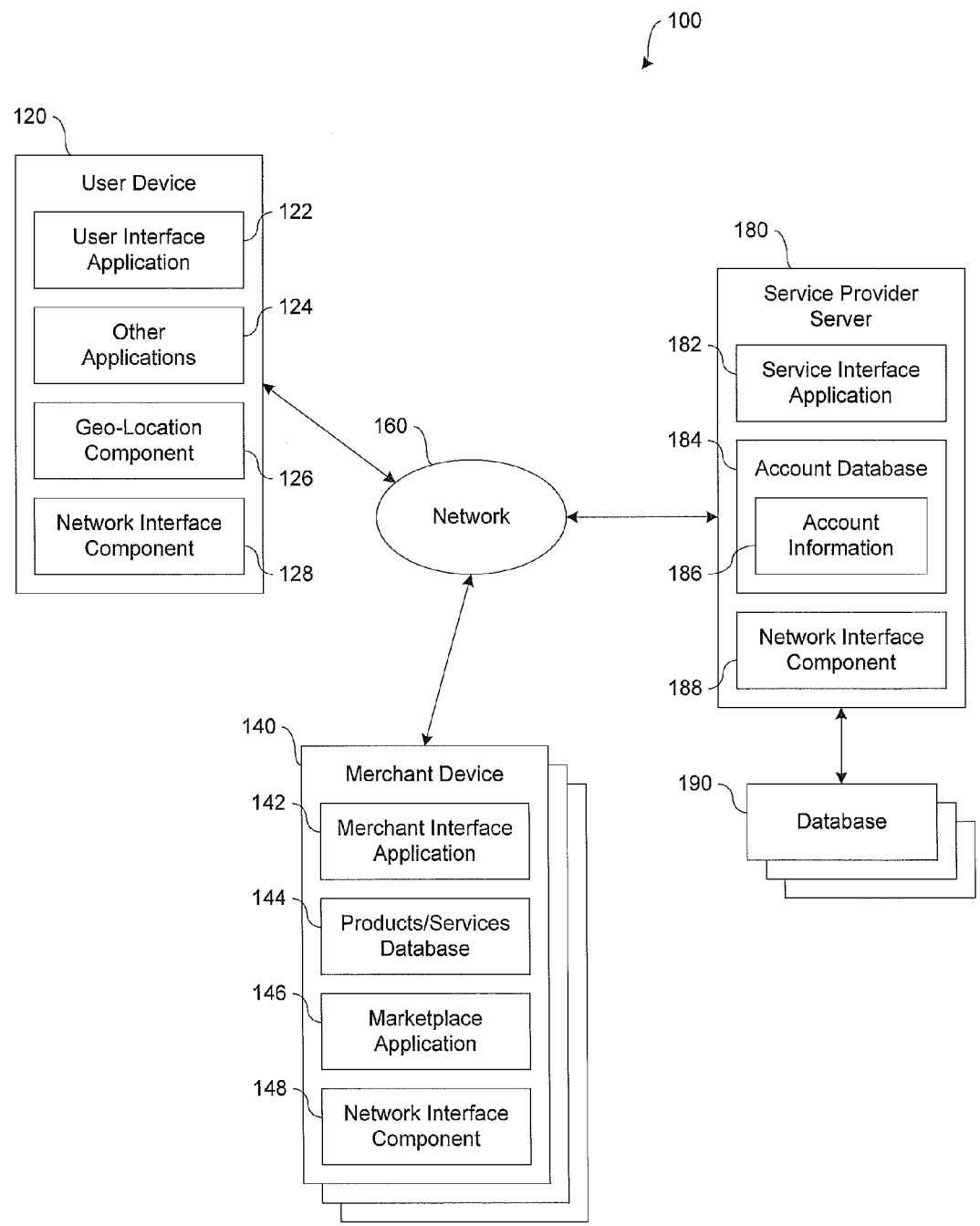
FIG. 1 shows a block diagram of a system adapted to facilitate location based mobile commerce over a network, in accordance with an embodiment of the present disclosure.

Embodiments of the invention and their advantages are best understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Embodiments of the present disclosure provide systems and methods for location based mobile commerce. Embodiments of the present disclosure provide end-to-end systems and methods for merchants to list items, products, and services that may be searched and purchased through a user based device. In one implementation, merchants have the capability to create an electronic shop via a communication network, such as via a mobile communication device (e.g., a cell phone) and/or the Internet. The electronic shop may be integrated with purchase and payment options (e.g., an online payment processing service) for a user to purchase directly from the user's mobile communication device.

In another implementation, service offering of the location based mobile commerce may be optimized based on the user's geo-location and preferences. In one aspect, geo-location may be based on zip-code information and/or location information (e.g., longitude and latitude via global positioning system (GPS) coordinates), which may be established by the service offering. For example, the system and methods may utilize GPS information inherent in mobile communication devices or a user's manual input of GPS and/or zip-code information. A user may search for items, products, and services based on geo-location information related to merchants, and the user's search results for intended items, products, and services to be purchased may be displayed as a merchant listing to the user via a mobile communication device. In one example, the user may scan a barcode of an item to search for the item in a current locality.

In another implementation, comparison shopping may be facilitated by overlaying search results with different merchants and network based shopping platforms. Merchants may interface with mapping and GPS capability inherent to mobile communication devices to monitor and track querying users. Accordingly, merchants have the capability to view potential buyers of their items, products, and services. In one aspect, merchants have the capability to generate a detailed report on searches for there items, products, and services with information related to querying statistics from different locations. For example, merchants may view which items are searched the most from which locations, and merchants may generate a report on whether increasing a radius of coverage could improve sales.

In another example, the merchant may receive notification that an item has been purchased (e.g., through a text, an email, and/or a resident client application). In another example, the merchant may manage item listing via a mobile communication device (e.g., supply chain management, inventory control, etc). These and other embodiments of the present disclosure will be described in greater detail herein.

FIG. 1 shows one embodiment of a system 100 for facilitating financial transactions including location based mobile commerce over a network 160, such as the Internet via, e.g., mobile communication networks. As shown in FIG. 1, the system 100 includes a user device 120 (e.g., a client or customer device) adapted to interface with one or more merchant devices 140 (e.g., business entities proffering items, products, and/or services for purchase), and a service provider 160 (e.g., a network based financial transaction service provider, such as a payment and settlement transaction provider) over the network 160.

The network 160, in one embodiment, may be implemented as a single network or a combination of multiple networks. For example, the network 160 may include a wireless telecommunications network (e.g., cellular telephone network) adapted for communication with one or more other communication networks, such as the Internet. In other examples, the network 160 may include the Internet, one or more intranets, landline networks, wireless networks, and/or one or more other appropriate types of communication networks. As such, in various implementations, the user device 120, the one or more merchant devices 140, and the service provider server 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In one embodiment, the user device 120 may be implemented as a mobile communication device (e.g., wireless cellular phone) adapted for communication with the network 160. In other embodiments, the user device 120 may be implemented as a personal computer (PC), a personal digital assistant (PDA), a notebook computer, and/or various other generally known types of wired and/or wireless computing devices for communication with the network 160. It should be appreciated that the user device 120 may be referred to as a client device or a customer device without departing from the scope of the present disclosure.

The user device 120, in one embodiment, includes a user interface application 122, which may be utilized by a user to conduct network based financial transactions (e.g., remote network based commerce, such as shopping, purchasing, bidding, etc.) with the one or more merchant devices 140 and/or the service provider server 180 over the network 160. For example, the user interface application 122 may be implemented as a location based mobile commerce application to initiate, track, manage, and store information related to remote network based commerce for viewing, searching, and purchasing of items, products, and/or services over the network 160. In one implementation, the user device 120 may be linked to an account with the service provider 160 for direct and/or automatic settlement of purchase requests between the user and the one or more merchant devices 140 via the user interface application 122, in a manner as described herein.

In one embodiment, the user interface application 122 comprises a software program, such as a graphical user interface (GUI), executable by a processor that is configured to interface and communicate with the one or more merchant devices 140 and/or the service provider server 180 via the network 160. In one aspect, the user interface application 122 comprises a browser module that provides a network interface to browse information available over the network 160. For example, the user interface application 122 may be implemented, in part, as a web browser to view and search information available over the network 160. In another example, the user is able to access merchant websites of the one or more merchant devices 140 over the network 160 to view, search, and select items, products, and/or services for purchase, and the user is able to purchase selected items, products, and/or services from the one or more merchant devices 140 via the service provider server 180. As such, the user may conduct network based financial transactions (e.g., location based mobile commerce for purchasing and proffering payment for items, products, and/or services) from the one or more merchant devices 140 via the service provider server 180.

The user device 120, in various embodiments, may include other applications 124 as may be desired in one or more embodiments of the present disclosure to provide additional features available to the user. In one example, such other applications 124 may include security applications for implementing user-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 160.

The user device 120, in one embodiment, includes a geo-location component 126 adapted to monitor and provide an instant geographical location (i.e., geo-location) of the user device 120. In one implementation, the geo-location of the user device 120 may include global positioning system (GPS) coordinates, zip-code information, area-code information, street address information, and/or various other generally known types of geo-location information. In one example, the geo-location information may be directly entered into the user device 120 by the user via a user input component, such as a keyboard, touch display, and/or voice recognition microphone. In another example, the geo-location information may be automatically obtained and/or provided by the user device 120 via an internal or external GPS monitoring component. In one aspect, when interfacing with the user device 120, the user may elect to provide or may be prompted to provide permission for the release of geo-location information. Accordingly, the user may have exclusive authority to allow transmission of geo-location information from the user device 120 to the one or more merchant devices 140 and/or the service provider server 180. In any instance, the one or more merchant devices 140 and/or the service provider server 180 may communicate with the user device 120 via the network 160 and request permission to acquire geo-location information from the user device 120 for geo-location based mobile commerce. These and other aspects of the present disclosure are described in greater detail herein.

The user device 120, in one embodiment, includes a network interface component (NIC) 128 adapted for communication with the network 160. In various implementations, the network interface component 128 may comprise a wireless communication component, such as a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The user device 120, in one embodiment, may include a user identifier, which may be implemented, for example, as operating system registry entries, cookies associated with the user interface application 122, identifiers associated with hardware of the user device 120, and/or various other appropriate identifiers. The user identifier may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier may be passed with a user login request or purchase request to the service provider server 180 via the network 160, and the user identifier may be used by the service provider server 180 to associate the user with a particular user account maintained by the service provider server 180, in a manner as described herein.

The one or more merchant devices 140, in one embodiment, may be implemented using any appropriate combination of hardware and/or software configured for wired and/or wireless communication over the network 160. In one embodiment, the merchant device 140 may be implemented as a mobile communication device (e.g., wireless cellular phone) adapted for communication with the network 160. In other embodiments, the merchant device 140 may be implemented as a network server, a personal computer (PC), a personal digital assistant (PDA), a notebook computer, and/or various other generally known types of wired and/or wireless computing devices for communication with the network 160.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 160. Accordingly, each of the one or more merchant devices 140 may comprise at least one network based server in communication with the network 160 having a merchant interface application 142, a products/services database 144, and a marketplace application 146 for presenting and identifying one or more available items, products, and/or services for purchase via the network 160, which may be made available to the user device 120 for viewing and purchase by the user. In one aspect, each of the network based merchant servers may be accessible via a mobile communication device (e.g., wireless cellular phone) for management purposes. For example, each merchant entity has the ability to access and interact with their own network based merchant server via a mobile communication device to manage merchant parameters, item listings, radius of coverage, user search statistics, etc. and generate reports related thereto.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users and/or the service provider server 180 over the network 160. For example, the merchant interface application 142 may be implemented as a location based mobile commerce application to initiate, track, manage, and store information related to remote network based commerce for the viewing, searching, and purchasing of items, products, and/or services over the network 160. In one implementation, each of the merchant devices 140 may be linked to an account with the service provider 160 for direct and/or automatic settlement of purchase requests between the each merchant 140 and one or more users via the merchant interface application 142 and the marketplace application 146, in a manner as described herein.

In one embodiment, the merchant interface application 142 comprises a software program, such as a GUI, executable by a processor that is configured to interface and communicate with one or more users and/or the service provider server 180 via the network 160. In another implementation, the merchant interface application 142 comprises a network interface module that makes information available to the user device 120 over the network 160. For example, the merchant interface application 142 may be implemented, in part, as a website manager to provide, list, and present information to the user device 120 via the network 160. In another example, each merchant 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider server 180. Accordingly, each of the merchant devices 140 may conduct financial transactions (e.g., location based mobile commerce for purchasing and proffering payment for items, products, and/or services) with the user via the merchant interface application 142 and the service provider server 180, in a manner as described herein.

Each of the merchant devices 140, in one embodiment, may include a marketplace application 146, which may be configured to provide information related to the products and/or services database 144 to the user interface application 122 of the user device 120 via the network 160. For example, the user may interact with the marketplace application 146 through the user interface application 122 over the network 160 to search and view various items, products, and/or services available for purchase from the products/services database 144. The marketplace application 146 may include a checkout module, which may be configured to facilitate online financial transactions (e.g., geo-location based mobile commerce) by the user of items, products, and/or services identified by each merchant server 140 for purchase. Accordingly, in one aspect, the checkout module of the marketplace application 146 may be configured to accept payment from the user over the network 160 and process the payment via interaction with the service provider server 180, in a manner as described herein.

Each of the merchant devices 140, in various embodiments, may include at least one merchant identifier, which may be included as part of the one or more items, products, and/or services made available for purchase so that, e.g., particular items, products, and/or services are associated with particular merchant devices 140. In one implementation, the merchant identifier may include one or more attributes and/or parameters related to the merchant, such as business and/or banking information. For example, the merchant identifier may be passed from a particular merchant 140 to the service provider server 180 when the user selects an item, product, and/or service for hold, monitor, and/or purchase from the particular merchant 140. The merchant identifier 148 may be used by the service provider server 180 to associate particular items, products, and/or services selected for purchase with a particular merchant account maintained by the service provider server 180. As described in greater detail herein, the user may conduct financial transactions (e.g., selection, monitoring, purchasing, and/or providing payment for items, products, and/or services) with each merchant server 140 via the service provider server 180 over the network 160.

In various embodiments, each of the one or more business entities having a related merchant server 140 may need to establish at least one merchant account with the service provider server 180. When establishing a merchant account, each of the one or more business entities may need to provide business information, such as owner name, owner address, social security number, date of birth, phone number, email address, etc., and financial information, such as banking information, merchant account information, credit card information, payment processing information, etc.

Each of the merchant devices 140, in various embodiments, includes a network interface component (NIC) 148 adapted for communication with the network 160. In various implementations, the network interface component 148 may comprise a wireless communication component, such as a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider server 180, in one embodiment, may be maintained by an online transaction processing entity, which may provide processing for online financial transactions and/or information transactions between the user device 120 and one or more of the merchant devices 140. As such, the service provider server 180 includes a service interface application 182, which may be adapted to interact with the user device 120 and/or each merchant 140 over the network 160 to facilitate the selection, purchase, and/or payment of items, products, and/or services by the user device 120 from one or more of the merchant devices 140. In one example, the service provider server 180 may be provided by PayPal, Inc. and/or eBay of San Jose, Calif., USA.

The service interface application 182, in one embodiment, utilizes a payment processing module to process purchases and/or payments for financial transactions between the user device 120 and each of the merchant devices 140. In one implementation, the payment processing module assists with resolving financial transactions through validation, delivery, and settlement. Accordingly, the service interface application 182 in conjunction with the payment processing module is adapted to settle indebtedness between the user device 120 and each of the merchant devices 140, wherein accounts may be directly and/or automatically debited and/or credited of monetary funds in a manner as accepted by the banking industry.

The service application 182, in one embodiment, may utilize a selection processing module to process and monitor user selection events during online shopping by the user via the user device 120. In one aspect, the selection processing module allows the service provider server 180 to process and monitor user selections during online navigation and shopping events over the network 160. For example, the service provider server 180 interfaces with the user device 120 via, e.g., a browser window to monitor the user and the user device 120 during navigation and shopping events on various merchant sites. The selection processing module may be used by the service provider server 180 to monitor user selections of one or more items, products, and/or services.

The service provider server 180, in one embodiment, may be configured to maintain one or more user accounts and merchant accounts in an account database 184, each of which may include account information 186 associated with one or more individual users and the one or more merchant devices 140). For example, account information 186 may include private financial information of the user and each merchant 140, such as one or more account numbers, passwords, credit card information, banking information, or other types of financial information, which may be used to facilitate online financial transactions between the user and the one or more merchant devices 140. In various implementations, the methods and systems described herein may be modified to accommodate additional users and/or additional merchants that may or may not be associated with at least one existing user account and/or merchant account, respectively.

In one implementation, the user and/or the user device 120 may have identity attributes stored with the service provider server 180, and the user and/or user device 120 may have credentials to authenticate or verify identity with the service provider server 180. In one aspect, user attributes may include personal information and banking information, as previously described. In various other aspects, the user attributes may be passed to the service provider server 180 as part of a login, selection, purchase, and/or payment request, and the user attributes may be utilized by the service provider server 180 to associate the user and/or the user device 120 with one or more particular user accounts maintained by the service provider server 180.

Similarly, in another implementation, each of the merchant devices 140 may have identity attributes stored with the service provider server 180, and each of the merchant devices 140 may have credentials to authenticate or verify identity with the service provider server 180. In one aspect, merchant attributes may include business information and banking information, as previously described. In various other aspects, the merchant attributes may be passed to the service provider server 180 as part of a login and/or transaction request, and the merchant attributes may be utilized by the service provider server 180 to associate each of the merchant devices 140 with one or more particular merchant accounts maintained by the service provider server 180.

The service provider server 180, in various embodiments, may include at least one network interface component (NIC) 188 adapted for communication with the network 160 and any network based communication devices including the network interface component 128 of the user device 120 and the network interface component 148 of each merchant 140. In various implementations, the network interface component 188 of the service provider server 180 may include a wireless communication component, such as a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider server 180, in various embodiments, may include one or more databases 190 (e.g., internal and/or external databases) for storing and tracking information related to financial transactions between particular users, such as the user, the one or more merchant devices 140, and the service provider server 180. For example, the databases 190 may provide a historical survey of financial transactions (e.g., remote network based financial transactions, such as geo-location based mobile commerce) between the user device 120, the one or more merchant devices 140, and the service provider server 180. As such, in one implementation, the service interface application 182 may be adapted to track, log, store financial transaction information related to network based commerce between the user device 120 and each merchant 140 and then access this financial information from the databases 190 for analysis, maintenance, and settlement.

Figure 2:
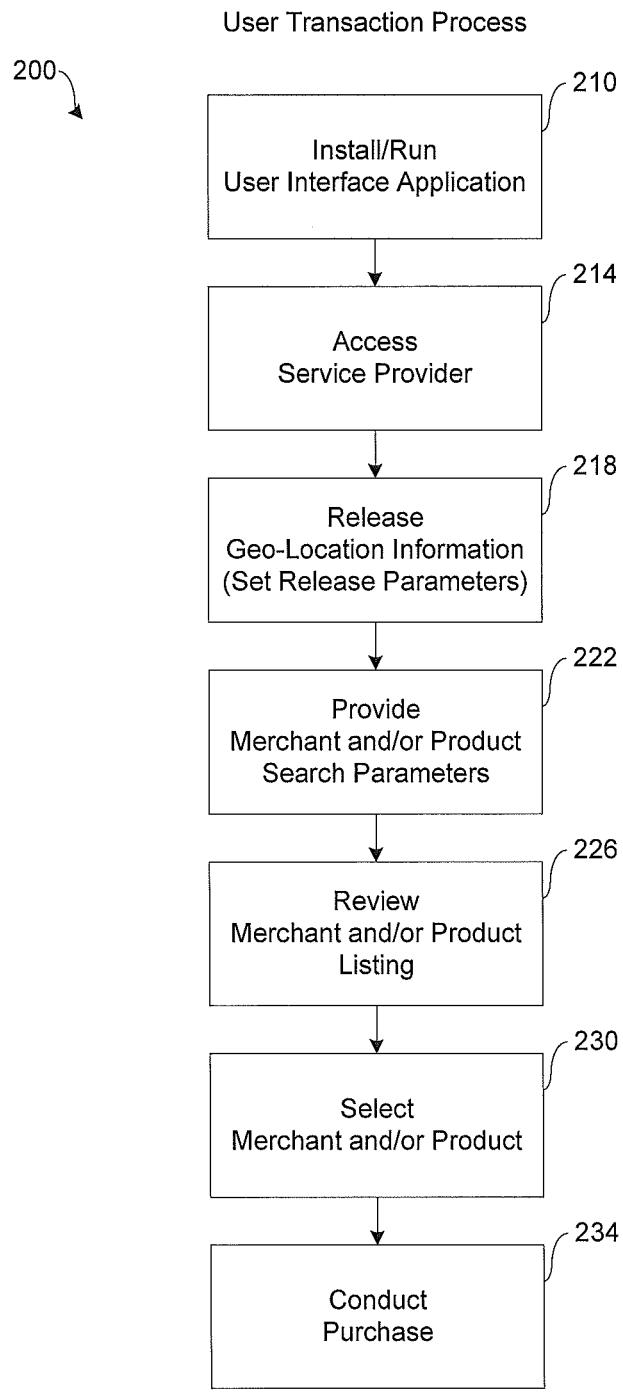
FIG. 2 shows one embodiment of a method for facilitating user-side location based mobile commerce over a network, in accordance with an embodiment of the present disclosure.

FIG. 2 shows one embodiment of a method 200 for facilitating a financial transaction (e.g., a user transaction process) including location based mobile commerce over the network 160, such as the Internet via, e.g., mobile communication networks. Referring to FIG. 2, the method 200 facilitates a user-side transaction process over the network 160 in reference to the user device 120 and the user interface application 122. In one implementation, the user interface application 122 allows the user device 120 to communicate with the service provider server 180 via the network 160 to conduct remote commerce, such as searching, selecting, and monitoring one or more items, products, and/or services for purchase consideration provided by the one or more of the merchant devices 140 and to communicate with the service provider server 180 to process online financial transactions (e.g., purchase requests) for items, products, and/or services selected for purchase.

In one implementation, upon user instruction, the user interface application 122 may be installed and/or run on the user device 120 (block 214). A user may run the user interface application 122 on the user device 120 to access the service provider server 180 (block 214) via the network 160. In one aspect, upon installation and/or execution of the user interface application 122, the user may be prompted to establish a user account for login with the service provider server 180, wherein the user may use the user interface application 122 and the user device 120 to access the service provider server 180 via the network 160. When establishing a user account, the user may be asked to provide personal information, such as name, address, phone number, etc., and financial information, such as banking information, credit card information, etc. In another aspect, referring to FIG. 1, information related to the user may be packaged as a user identifier.

Next, the user releases geo-location information to the service provider server 180 by, e.g., setting release parameters (block 218). In one aspect, the user geo-location information includes user information related to a physical location or position of the user device 120 embedded as arguments in an expression, which are passed to the service provider server 180 via the network 160. The user geo-location information may include GPS coordinates (e.g., longitude and latitude) inherent to the user device 120, such as a mobile cellular phone, and/or zip-code information. The user geo-location information may include user identifier information having dynamic arguments identifying the user. The user may manually set geo-location information, such as a zip code and/or longitude and latitude coordinates.

In another aspect, release parameters may be manually set by the user. For example, the user may allow automatic distribution of geo-location information for any query by the one or more merchants 140 associated with the service provider server 180, or the user may only allow release of geo-location information for some trusted merchants. For example, the user may elect to grant permission to preferred merchants and exclude other merchants that the user deems undesirable.

In one embodiment, location based mobile commerce may be optimized based on the user's geo-location and preferences. For example, the geo-location of the user may be based on zip-code information and/or location information (e.g., GPS coordinates), which may be established by the service provider 180 by utilizing GPS information inherent in the user device 120 (e.g., mobile communication device) or a user's manual input of GPS and/or zip code information to the user device 120. Accordingly, a user may search for items, products, and services based on geo-location information related to either the user or merchants, and the user's search results for intended items, products, and services to be purchased may be displayed as a merchant listing to the user via the user device 120. In one example, the user may scan a barcode of an item to search for the item in a current locality.

Next, the user provides merchant and/or product search parameters (block 222). In one implementation, the user may provide merchant and/or product search parameters to search and view items, products, and/or services for purchase consideration. In another implementation, comparison shopping may be facilitated by overlaying search results with different merchants and network based shopping platforms. Users may interface with mapping and GPS capability inherent to the user device 120 to monitor and track items, products, and services offered by particular merchants. As such, users have the capability to view items, products, and services for comparison shopping.

Next, the user reviews merchant and/or product listings (block 226). In one aspect, the merchant and/or product listings is displayed as one or more searchable lists on a display component of the user device 120, such as a viewable text image on a display of a mobile communication device.

Next, the user select a merchant and/or product (block 230) and conducts a purchase transaction (block 234). In one implementation, the user interfaces with the service provider server 180 to provide a purchase request for one or more items, products, and/or services selected from the merchant and/or product listing. The service provider server 180 is adapted to process the purchase transaction on behalf of the user and the merchant.

Figure 3:
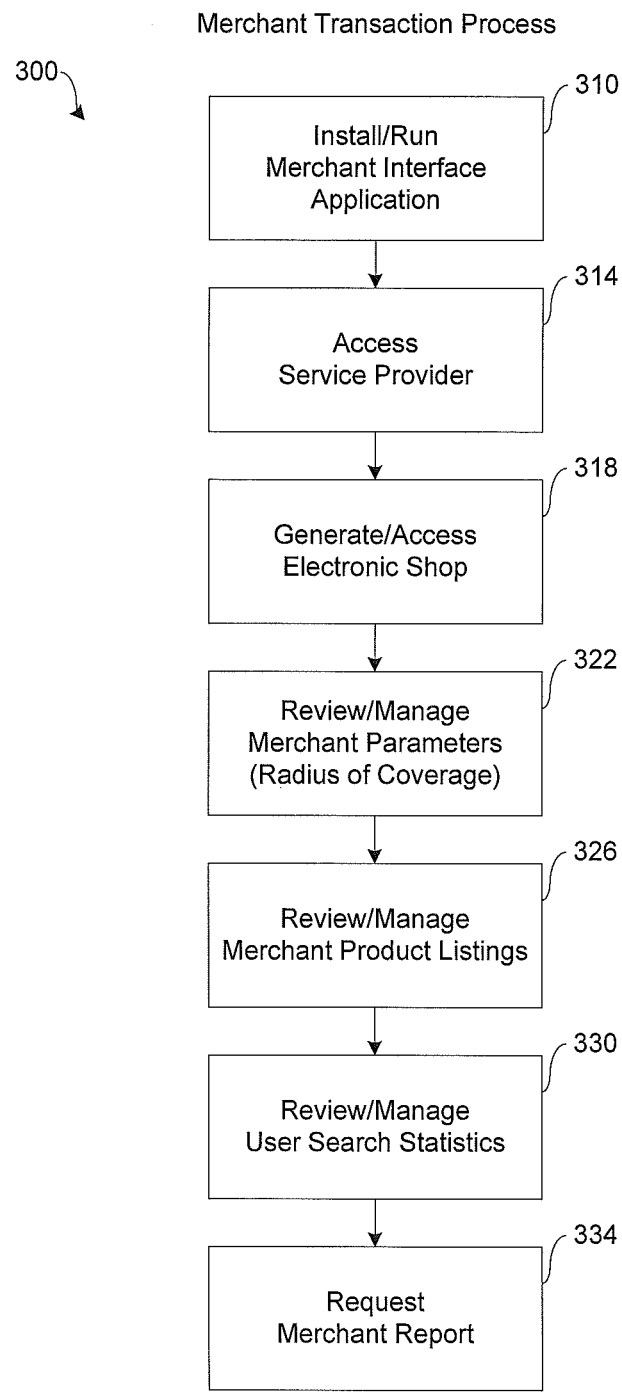
FIG. 3 shows one embodiment of a method for facilitating merchant-side location based mobile commerce over a network, in accordance with an embodiment of the present disclosure.

FIG. 3 shows one embodiment of a method 300 for facilitating a financial transaction (e.g., a merchant transaction process) including location based mobile commerce over the network 160, such as the Internet via, e.g., mobile communication networks. Referring to FIG. 3, the method 300 facilitates a merchant-side transaction process over the network 160 in reference to the merchant devices 140 and the merchant interface application 142. In one implementation, the merchant interface application 142 allows the merchant devices 140 to communicate with the service provider server 180 via the network 160 to conduct remote commerce, such as listing and proffering items, products, and/or services for sale or purchase consideration and to communicate with the service provider server 180 to process online financial transactions (e.g., purchase requests) for proffered items, products, and/or services listed for purchase.

In one implementation, upon merchant instruction, the merchant interface application 142 may be installed and/or run on the merchant devices 140 (block 314). A merchant may run the merchant interface application 142 on the merchant device 140 to access the service provider server 180 (block 314) via the network 160. In one aspect, upon installation and/or execution of the merchant interface application 142, the merchant may be prompted to establish a merchant account for login with the service provider server 180, wherein the merchant may use the merchant interface application 142 and the merchant device 140 to access the service provider server 180 via the network 160. When establishing a merchant account, the merchant may be asked to provide business information, such as business name, address, phone number, etc., and financial information, such as banking information, credit card information, etc. In another aspect, referring to FIG. 1, information related to the merchant may be packaged as a merchant identifier.

Next, the merchant generates and/or accesses an electronic shop or listing related to the merchant (block 318). In one implementation, the electronic shop refers to a listing of items, products, and/or services proffered for sale or purchase consideration provided by the merchant to the service provider server 180. One or more items, products, and/or services listed by the merchant may be sent to the user device 140 by the service provider server 180 when the user conducts a merchant and/or products search. This listing of items, products, and/or services may be sent to the user device 120 via the network 160 when the user is in a particular radius of coverage (e.g., preferred region) indicated by the merchant.

In one embodiment, the system 100 of FIG. 1 and method 300 of FIG. 3 provides merchants the capability to list items, products, and services that may be searched and purchased through a user based mobile communication device. In one implementation, merchants have the capability to create an electronic shop via the network 160 via a mobile communication device (e.g., a cell phone). The electronic shop may be integrated with purchase and payment options via the service provider 180 for a user to purchase directly from the user's mobile communication device 120.

Next, the merchant may review and/or manage merchant parameters from the merchant device 140 (block 322). In one aspect, the merchant parameters may include a designation of a radius of coverage (e.g., preferred region of coverage, such as a specified zip-code or a physical region) for the merchant. For example, if the merchant is located in a particular zip-code, then the merchant prefers to list items, products, and/or services provided by the merchant to the user device 120 when the user searches for items, products, and/or services related to the merchant. As such, the merchant is able to target particular user devices (e.g., user device 120) that is searching for items, products, and/or services that the merchant offers for sale or purchase consideration.

In one embodiment, radius of coverage may be related to geo-location information, such as GPS coordinates (e.g., longitude and latitude) inherent to the physical location of the merchant and/or the user. The merchant geo-location information may include merchant identifier information having dynamic arguments identifying the GPS position of the merchant and, in some instances, the GPS position of the items, products, and/or services as indicated by the merchant. The merchant may manually set geo-location information, such as a zip code and/or longitude and latitude coordinates, or the service provider server 180 may provide these coordinates based on an address provided by the merchant.

In one embodiment, location based mobile commerce may be optimized based on the user's geo-location and preferences. In one aspect, merchants may target geo-locations that may be based on zip-code information and/or location information (e.g., longitude and latitude via GPS coordinates), which may be established by the service provider 180.

Other merchant parameters may include when and how often the list of items, products, and/or services may be sent to user devices 120. For example, the merchant may allow automatic distribution of listings for any query by one or more users associated with the service provider server 180, or the merchant may only allow distribution of listings for particular users. For example, the merchant may only allow distribution listings to be sent to users that may be interested in their items, products, and/or services.

Next, the merchant may review and/or manage merchant product listings from the merchant device 140 (block 326). In one aspect, the merchant may provide descriptions of items, products, and/or services for sale or purchase consideration. In another aspect, the merchant may manage item listing (e.g., supply chain management, inventory control, etc) via a mobile communication device.

Next, the merchant may review and/or manage user search statistics from the merchant device 140 (block 330). In one embodiment, merchants may interface with mapping and GPS capability inherent to mobile communication devices to monitor and track querying users via the network 160. As such, merchants have the capability to view potential buyers of their items, products, and services. In one aspect, merchants have the capability to generate a detailed report on searches for there items, products, and services with information related to querying statistics from different locations. For example, merchants may view which items are searched the most from which locations, and merchants may generate a report on whether increasing a radius of coverage could improve sales. In another embodiment, merchants may receive notification that an item, product, and/or service has been purchased (e.g., through a text, an email, and/or a resident client application).

Next, the merchant may request a merchant report from the merchant device 140 (block 334). The merchant report may outline current and/or past merchant parameters including radius of coverage, product listings, and user search statistics. The merchant report may include any changes made to merchant parameters including radius of coverage and product listings.

Figure 4A:
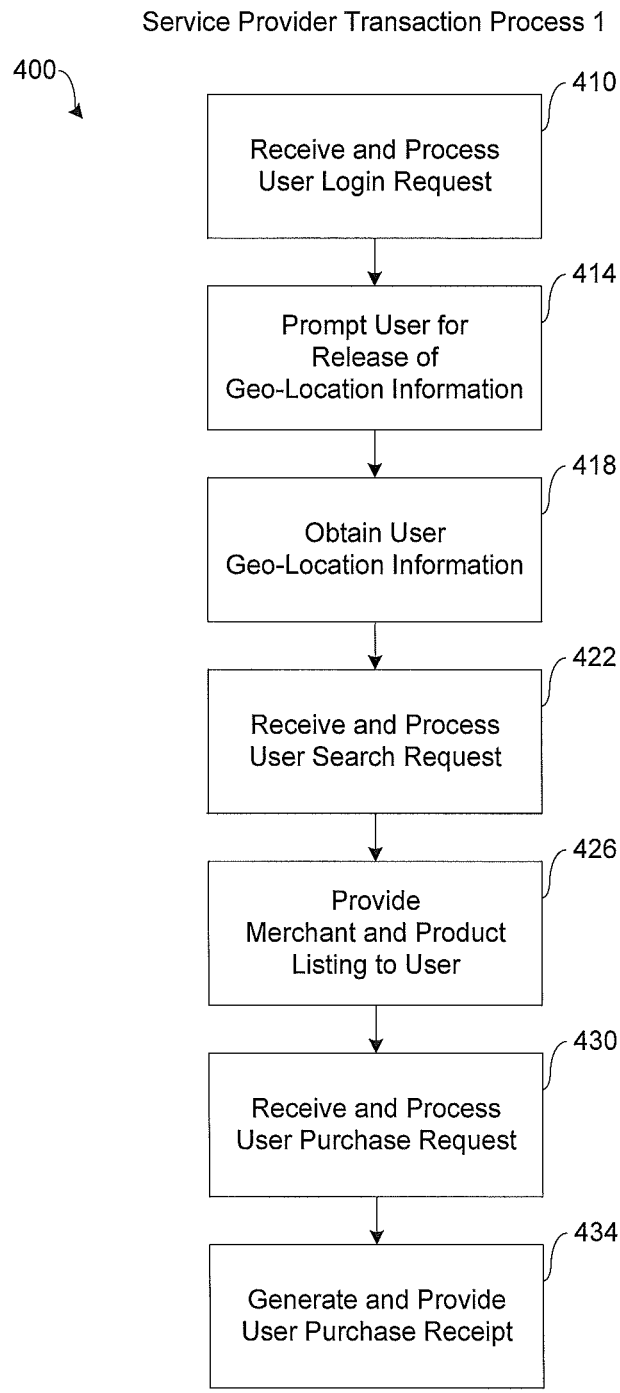
FIGS. 4A, 4B show embodiments of a method for facilitating server-side location based mobile commerce over a network, in accordance with an embodiment of the present disclosure.

FIG. 4A shows one embodiment of a method 400 for facilitating financial transactions (e.g., a service provider transaction process on behalf of the user) including location based mobile commerce over the network 160, such as the Internet via. e.g., mobile communication networks. Referring to FIG. 4A, the method 400 facilitates a server-side transaction process over the network 160 in reference to the user device 120 via the user interface application 122. In one implementation, the service interface application 182 allows the service provider server 180 to communicate with the user device 120 and the merchant device 140 via the network 160 to process geo-location based commerce and services on behalf of the user and the merchant (e.g., such as searching, selecting, and monitoring one or more items, products, and/or services for purchase consideration).

In one implementation, the service provider server 180 receives a login request from the user via the user device 120 (block 410), and then the service provider server 180 processes the user login request (block 410). In one aspect, upon receiving the user login request, the service provider server 180 may determine whether the user is an existing user having an established user account 184 by, e.g., checking a user account list in a user account database. If the user does not have an established user account, then the service provider server 180 prompts the user to establish a user account 184 by providing user information 186, and the service provider server 180 uploads the user interface application 122 to the user device 120 so that the user may install and run the user interface application 122 on user device 120. Once the user interface application 122 is installed and run on the user device 120, the service provider server 180 prompts the user for release of current geo-location information (block 414). Otherwise, if the user is determined to be an existing user by the service provider server 180, then the service provider server 180 verifies the user account and user identification information provider by user in the user login request. The service provider server 180 may determine if the user account is current and active. In some instances, user account information may need to be updated, and thus, the service provider server 180 may prompt the user to update user account information 186 in the user account 184 for the user. However, if the user account 184 is current and active, then the service provider server 180 the service provider server 180 prompts the user for release of current geo-location information (block 414). It should be appreciated by those skilled in the art that the service provider server 180 may cancel the user login request at any time during the process of method 400 if, e.g., it is determined by the service provider server 180 that the user enters wrong information or the user is trying to purchase an item with criminal intent.

Next, if the user releases current geo-location information, the service provider server 180 is adapted to obtain the user's geo-location information from the user device 120 (block 418) via communication between the service interface application 182 and the user interface application 122 of the user device 120. Accordingly, the service provider server 180 may use the geo-location information of the user to process user search requests for merchants and items, products, and services of these merchants.

Next, the service provider server 180 is adapted to receive and process user search requests from the user device 120 (block 422). In one implementation, the service provider server 180 is adapted to track user selections by monitoring user events as provided by the user and the user device 120 via the user interface application 122. The user selections may be constantly updated, when, e.g., user makes changes (e.g., additions, deletions, movements, etc.) to user selections via the user interface application 122. In another aspect, the service provider server 180 is adapted to display updated user selections to the user via the user interface application 122.

The service provider server 180 may store, either temporarily or permanently, the user selections and/or any changes to the user selections for reference and other additional processing.

Next, based on user selection information received from the user device 120, the service provider server 180 is adapted to provide merchant and/or product listings to the user 120 (block 426). Next, the service provider server 180 is adapted to receive and process user purchase requests from the user device 120 (block 430), and the service provider server 180 is adapted to generate and provide user purchase receipts to the user via the user device 120 (block 434).

In one embodiment, the service provider server 180 tracks and monitors user search and purchase requests from the merchant and/or product listings. For example, the service provider server 180 links the generated merchant and/or product listings, and item selection information related thereto, to a user account in the account database 192 related to the user. This allows the service provider server 180 to monitor and update the user's merchant and/or product listings for the user, as instructed and/or requested by the user. In one aspect, this tracking and monitoring information may be provided to the merchants for review.

In another embodiment, the service provider server 180 may process purchase request and any related purchase information provided by the user. The purchase request and/or the purchase information may include information related to the items selected for purchase consideration in the merchant and/or products listings, information related to the merchant providing the selected items for purchase consideration, information related to the user including user account number, balance information, credit card information, etc. The service provider server 180 may access the merchant device 140 to verify purchase information including verifying that the selected item is available (e.g., in stock), verifying pricing information, verifying that the merchant account is up-to-date, etc.

In another embodiment, the service provider server 180 may prompt the user via the user interface application 122 to verify a purchase request. For example, the service provider server 180 may ask the user to complete the purchase transaction by selecting a designated box to complete the purchase transaction. In this way, the service provider server 180 is adapted to allow the user to request processing and/or cancellation of any online financial transactions prior to completion. Based on user request, the service provider server 180 may complete any online financial transactions by deducting the amount of the purchase request from the user account and crediting the amount of the purchase request to a related merchant account. In one aspect, completing a purchase request may include confirming a purchase of the selected products to provide, e.g., a receipt to the user. The user interface application 122 may include a payment mechanism that allows the user to take different actions, such as making purchase requests and providing buttons to complete the purchase at a later time.

Figure 4B:
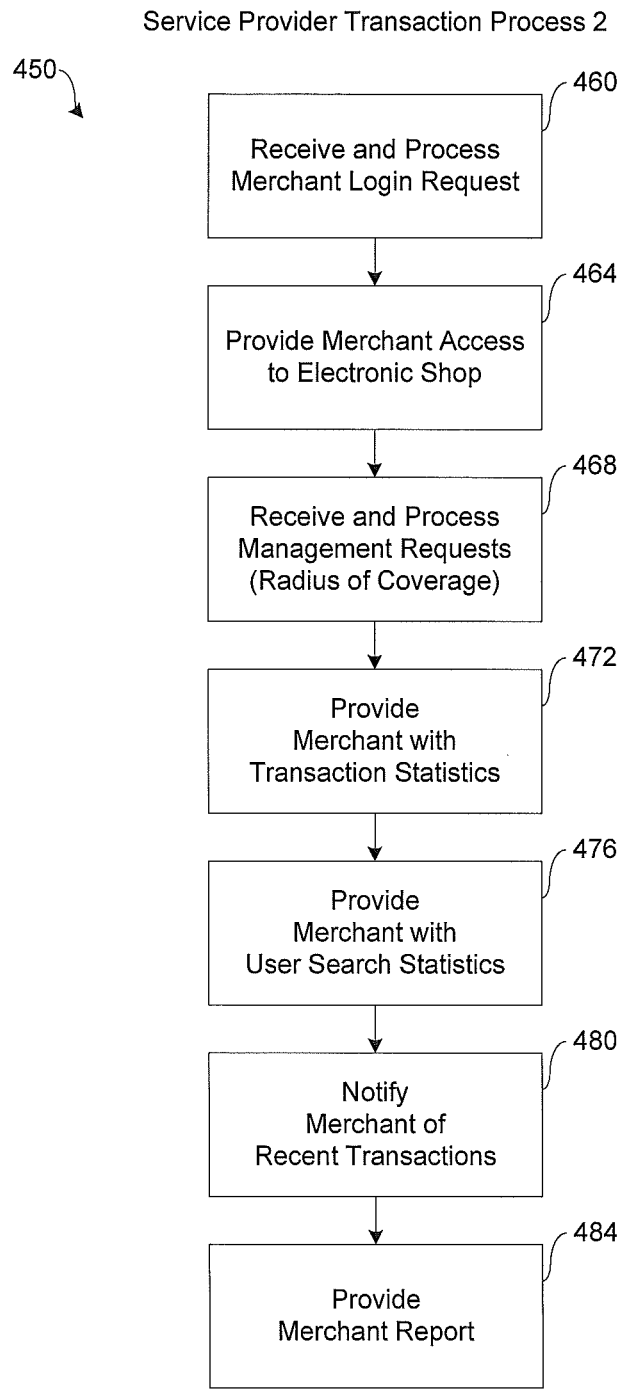

FIG. 4B shows one embodiment of a method 450 for facilitating financial transactions (e.g., a service provider transaction process on behalf of the merchant) including location based mobile commerce over the network 160, such as the Internet via, e.g., mobile communication networks. Referring to FIG. 4B, the method 450 facilitates a server-side transaction process over the network 160 in reference to the merchant devices 140 via the merchant interface application 142. In one implementation, the service interface application 182 allows the service provider server 180 to communicate with the merchant devices 140 to process geo-location based commerce and services and process online financial transactions (e.g., purchase requests) for items, products, and/or services selected for purchase between the user and the merchant.

In one implementation, the service provider server 180 receives a login request from the merchant via the merchant device 140 (block 460), and then the service provider server 180 processes the merchant login request (block 460). In one aspect, upon receiving the merchant login request, the service provider server 180 may determine whether the merchant is an existing merchant having an established merchant account 184 by, e.g., checking a merchant account list in a merchant account database. If the merchant does not have an established merchant account, then the service provider server 180 prompts the merchant to establish a merchant account 184 by providing merchant information 186, and the service provider server 180 uploads the merchant interface application 142 to the merchant device 140 so that the merchant may install and run the merchant interface application 142 on the merchant device 140. Once merchant user interface application 142 is installed and run on the merchant device 140, the service provider server 180 provides the merchant access to an electronic shop (block 464). Otherwise, if the merchant is determined to be an existing merchant by the service provider server 180, then the service provider server 180 verities the merchant account and merchant identification information provider by merchant in the merchant login request. The service provider server 180 may determine if the merchant account is current and active. In some instances, merchant account information may need to be updated, and thus, the service provider server 180 may prompt the merchant to update merchant account information 186 in the merchant account 184 for the merchant. However, if the merchant account 184 is current and active, then the service provider server 180 the service provider server 180 provides the merchant access to an electronic shop (block 464) related to the merchant. It should be appreciated by those skilled in the art that the service provider server 180 may cancel the merchant login request at any time during the process of method 450 if, e.g., it is determined that the merchant enters wrong information or the merchant is trying to unlawfully access an electronic shop.

Next, the service provider server 180 provides the merchant with access to an electronic shop or generate an electronic shop related to the merchant (block 464). In one implementation, the electronic shop refers to a listing of items, products, and/or services proffered for sale or purchase consideration provided by the merchant to the service provider server 180. One or more items, products, and/or services listed by the merchant may be sent to the user device 140 on behalf of the merchant by the service provider server 180 when the user conducts a merchant and/or products search. This listing of items, products, and/or services may be sent to the user device 120 via the network 160 when the user is in a particular radius of coverage (e.g., preferred region) indicated by the merchant.

In one embodiment, the service provider server 180 allows merchants to list items, products, and services that may be searched and purchased by the user via the user device 120, such as a mobile communication device. In one implementation, merchants have the capability to create an electronic shop over the network 160 via a mobile communication device (e.g., a cell phone). The electronic shop may be integrated with purchase and payment options via the service provider 180 for a user to purchase directly from the user's mobile communication device 120.

Next, the service provider server 180 is adapted to receive and process management requests from the merchant (block 468) including obtaining a radius of coverage from the merchant as provided or selected by the merchant. In one aspect, the radius of coverage comprises information related to an area of one or more zip-codes and/or an area of one or more GPS coordinates including longitude and latitude coordinates.

In one implementation, the merchant may review and/or change merchant parameters from the merchant device 140. For example, merchant parameters may include a designation of the radius of coverage (e.g., preferred region of coverage, such as a specified zip-code or a physical region identified by GPS coordinates including longitude and latitude information) identified by the merchant. For example, if the merchant is located in a particular zip-code, then the merchant prefers to list items, products, and/or services provided by the merchant to the user device 120 when the user searches for items, products, and/or services related to the merchant. As such, the merchant is able to target particular user devices (e.g., user device 120) that is searching for items, products, and/or services that the merchant offers for sale or purchase consideration. The merchant may optimize location based mobile commerce based on the user's geo-location and preferences. For example, merchants may target geo-locations within a specified radius of coverage that may be based on zipcode information and/or location information (e.g., longitude and latitude via GPS coordinates), which may be established by either the merchant 140 and/or the service provider 180.

Other merchant parameters may include when and how often the list of items, products, and/or services may be sent to user devices 120. For example, the merchant may allow automatic distribution of listings for any query by one or more users associated with the service provider server 180, or the merchant may only allow distribution of listings for particular users. For example, the merchant may only allow distribution listings to be sent to users that may be interested in their items, products, and/or services.

Next, the service provider server 180 is adapted to provide the merchant with transaction statistics (block 472), provide the merchant with user search statistics (block 476), and notify the merchant of recent transactions (block 480). In one embodiment, merchants may interface with mapping and GPS capability inherent to mobile devices to monitor and track querying users via the network 160. As such, merchants have the capability to view potential buyers of their items, products, and services. In one aspect, merchants have the capability to generate a report on searches for there items, products, and services with information related to querying statistics from different locations. For example, merchants may view which items are searched the most from which locations, and merchants may generate a report on whether increasing a radius of coverage could improve sales. In another embodiment, merchants may receive notification that an item, product, and/or service has been purchased (e.g., through a text, an email, and/or a resident client application).

Next, the service provider server 180 is adapted to provide the merchant with a detailed report (block 484). In one embodiment, the merchant report may outline current and/or past merchant parameters including radius of coverage, product listings, and user search statistics. The merchant report may include any changes made to merchant parameters including radius of coverage and product listings.

Figure 5:
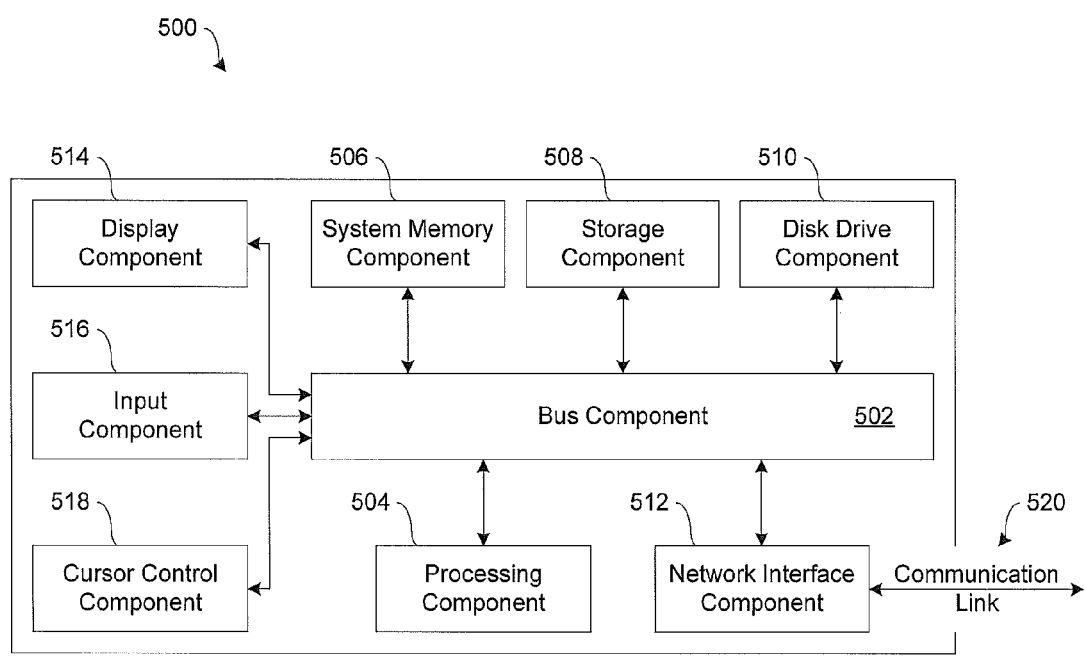
FIG. 5 is a block diagram of a computer system suitable for implementing one or more embodiments of the present disclosure.

FIG. 5 is a block diagram of a computer system 500 suitable for implementing one or more embodiments of the present disclosure, including the user device 120, the one or more merchant devices 140, and the service provider device 180. In various implementations, the client device 140 may comprise a network computing device capable of communicating with the network 160, such as a mobile communication device including a cell phone, a personal computer, laptop, PDA, etc., the one or more merchant devices 140 may comprise a network computing device capable of communicating with the network 160, such as a network communication device including a network server and/or a mobile communication device including a cell phone, and the service provider device 180 may comprise a network computing device, such as a network server. Hence, it should be appreciated that each of the devices 120, 140, 180 may be implemented as computer system 500 in a manner as follows.

In accordance with various embodiments of the present disclosure, computer system 500, such as a cell phone and/or a network server, includes a bus 502 or other communication mechanism for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), and cursor control component 518 (e.g., mouse or trackball). In one implementation, disk drive component 510 may comprise a database having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In one implementation, data related to encoded logic may be transferred to computer system 500 via communication link 520, and various transmission media, such as coaxial cables, copper wire, and fiber optics, including wires that comprise bus 502, may be utilized in the transfer of data. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 520 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information, and instructions, including one or more programs (i.e., application code) through communication link 520 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating financial transactions over a network, the method comprising:

communicating, by a server device, with a first mobile communication device over the network, the first mobile communication device associated with a user;

obtaining, by the server device, a geo-location of the first mobile communication device based on an election to release the geo-location to a trusted mobile merchant of a plurality of mobile merchants by the user;

communicating, by the server device, with a second mobile communication device over the network, the second mobile communication device associated with the trusted mobile merchant;

determining, by the server device, a dynamic radius of coverage for the second mobile communication device;

determining, by the server device, whether the geo-location of the first mobile communication device is within the dynamic radius of coverage of the second mobile communication device; and providing, by the server device, a listing to the first mobile communication device of one or more items for sale by the trusted mobile merchant when the first mobile communication device is within the dynamic radius of coverage of the second mobile communication device.

2. The method of claim 1, further comprising:
receiving one or more release parameters from the user via the first mobile communication device, the release parameters allowing release of geo-location information from the first mobile communication device;
receiving one or more search parameters from the user via the first mobile communication device, the search parameters identifying at least one specific item selected by the user; and
receiving one or more merchant parameters from the trusted mobile merchant via the second mobile communication device, the merchant parameters identifying the radius of coverage selected by the trusted mobile merchant.

3. The method of claim 1, further comprising:
verifying the identity of the user based on user information obtained from the first mobile communication device; and
verifying the identity of the trusted mobile merchant based on merchant information obtained from the second mobile communication device.

4. The method of claim 1, further comprising:
receiving a purchase request for at least one item on the listing from the user via the first mobile communication device; and
processing the purchase request on behalf of the user and the trusted mobile merchant.

5. The method of claim 1, further comprising:
maintaining at least one account for each of the user and the trusted mobile merchant,
wherein the accounts include account information related to the user and the trusted mobile merchant, and
wherein the account information comprises private financial information of the user and the trusted mobile merchant including at least one or more account numbers, passwords, credit card information, and banking information.

6. The method of claim 1, wherein the geo-location comprises information related to at least one of a zip-code and GPS coordinates including longitude and latitude coordinates.

7. The method of claim 1, wherein the radius of coverage comprises information related to at least one of an area of one or more zip-codes and an area of one or more GPS coordinates including longitude and latitude coordinates.

8. The method of claim 1, wherein providing a listing of one or more items for sale includes a list of products and services proffered for sale by the trusted mobile merchant.

9. The method of claim 1, wherein the network comprises at least one of a mobile communication network and the Internet.

10. The method of claim 1, wherein the first and second mobile communication devices comprise cellular phones.

11. A system for facilitating financial transactions over a network, the system comprising:
means for communicating with a first mobile communication device over the network, the first mobile communication device associated with a user;
means for obtaining a geo-location of the first mobile communication device based on an election to release the geo-location to a trusted mobile merchant of a plurality of mobile merchants by the user;
means for communicating with a second mobile communication device over the network, the second mobile communication device associated with the trusted mobile merchant;
means for determining a dynamic radius of coverage for the second mobile communication device;
means for determining whether the geo-location of the first mobile communication device is within the dynamic radius of coverage of the second mobile communication device; and
means for providing a listing to the first mobile communication device of one or more items for sale by the trusted mobile merchant when the first mobile communication device is within the dynamic radius of coverage of the second mobile communication device.

12. The system of claim 11, further comprising:
means for receiving one or more release parameters from the user via the first mobile communication device, the release parameters allowing release of geo-location information from the first mobile communication device;
means for receiving, one or more search parameters from the user via the first mobile communication device, the search parameters identifying at least one specific item selected by the user; and
means for receiving one or more merchant parameters from the trusted mobile merchant via the second mobile communication device, the merchant parameters identifying the radius of coverage selected by the trusted mobile merchant.

13. The system of claim 11, further comprising:
means for verifying the identity of the user based on user information obtained from the first mobile communication device; and
means for verifying the identity of the trusted mobile merchant based on merchant information obtained from the second mobile communication device.

14. The system of claim 11, further comprising:
means for receiving a purchase request for at least one item on the listing from the user via the first mobile communication device; and
means for processing the purchase request on behalf of the user and the trusted mobile merchant.

15. The system of claim 11, further comprising:
means for maintaining at least one account for each of the user and the trusted mobile merchant,
wherein the accounts include account information related to the user and the trusted mobile merchant, and
wherein the account information comprises private financial information of the user and the trusted mobile merchant including at least one or more account numbers, passwords, credit card information, and banking information.

16. The system of claim 11, wherein the geo-location comprises information related to at least one of a zip-code and GPS coordinates including longitude and latitude coordinates, and wherein the radius of coverage comprises information related to at least one of an area of one or more zip-codes and an area of one or more GPS coordinates including longitude and latitude coordinates.

17. The system of claim 11, wherein providing a listing of one or more items for sale includes a list of products and services proffered for sale by the trusted mobile merchant.

18. The system of claim 11, wherein the network comprises at least one of a mobile communication network and the Internet, and wherein the first and second mobile communication devices comprise cellular phones.

19. A non-transitory computer readable storage medium comprising computer readable instructions which when executed by a computer cause the computer to perform the following operations:

communicate with a first mobile communication device over a network, the first mobile communication device associated with a user;

obtain a geo-location of the first mobile communication device over the network based on an election to release the geo-location to a trusted mobile merchant of a plurality of mobile merchants by the user;

communicate with a second mobile communication device over the network, the second mobile communication device associated with the trusted mobile merchant;

determine a dynamic radius of coverage for the second mobile communication device over the network;

determine whether the geo-location of the first mobile communication device is within the dynamic radius of coverage of the second mobile communication device; and provide a listing to the first mobile communication device over the network of one or more items for sale by the trusted mobile merchant when the first mobile communication device is within the dynamic radius of coverage of the second mobile communication device.

20. The non-transitory computer readable medium of claim 19, further operable to:

receive one or more release parameters from the user via the first mobile communication device over the network, the release parameters allowing release of geo-location information from the first mobile communication device;

receive one or more search parameters from the user via the first mobile communication device over the network, the search parameters identifying at least one specific item selected by the user; and receive one or more merchant parameters from the trusted mobile merchant via the second mobile communication device over the network, the merchant parameters identifying the radius of coverage selected by the trusted mobile merchant.

* * * * *